United States Patent
Shoshan

(10) Patent No.: US 9,576,480 B1
(45) Date of Patent: Feb. 21, 2017

(54) CENTRALLY-MANAGED VEHICLE NETWORK

(71) Applicant: SAP SE, Walldorf (DE)

(72) Inventor: Itzhak Shoshan, Even Yehuda (IL)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/860,491

(22) Filed: Sep. 21, 2015

(51) Int. Cl.
| | |
|---|---|
| H04W 48/04 | (2009.01) |
| B60W 40/02 | (2006.01) |
| G08G 1/01 | (2006.01) |
| G08G 1/07 | (2006.01) |
| G07C 5/00 | (2006.01) |
| G08G 1/09 | (2006.01) |

(52) U.S. Cl.
CPC ............ *G08G 1/0112* (2013.01); *G07C 5/008* (2013.01); *G08G 1/07* (2013.01); *G08G 1/091* (2013.01)

(58) Field of Classification Search
CPC .. G08G 1/0112; G08G 1/0969; G08G 5/0013; H04W 48/05; G06F 13/102; G05D 1/0289; G05D 1/0214; A61B 5/6804; G06Q 30/02; B60W 40/02
USPC ......... 701/119; 455/404.2; 340/988; 717/115
See application file for complete search history.

(56) References Cited

U.S. PATENT DOCUMENTS

| | | | | |
|---|---|---|---|---|
| 2005/0090978 A1* | 4/2005 | Bathory | ............... | G08G 5/0013 701/469 |
| 2007/0040705 A1* | 2/2007 | Yoshioka | ............. | G08G 1/0969 340/988 |
| 2010/0063680 A1* | 3/2010 | Tolstedt | ............... | G05D 1/0214 701/41 |
| 2010/0198513 A1* | 8/2010 | Zeng | ..................... | B60W 40/02 701/300 |
| 2012/0323690 A1* | 12/2012 | Michael | ................. | G06Q 30/02 705/14.58 |
| 2013/0297387 A1* | 11/2013 | Michael | ............... | G08G 1/0112 705/13 |
| 2014/0282389 A1* | 9/2014 | Yemelyanov | ......... | G06F 13/102 717/115 |
| 2015/0025708 A1* | 1/2015 | Anderson | ............ | A61B 5/6804 701/2 |
| 2015/0073638 A1* | 3/2015 | Van Kuilenburg | .. | G05D 1/0289 701/22 |
| 2016/0150070 A1* | 5/2016 | Goren | ................... | H04W 48/04 455/404.2 |

OTHER PUBLICATIONS

"About," carknow.me website, visited Aug. 25, 2015, 4 pages.
"Developer," carknow.me website, visited Aug. 25, 2015, 4 pages.
Bertolucci, "Data Driven: Vehicle-To-Vehicle Communications Coming Soon," *Information Week*, Aug. 20, 2014, 10 pages.

(Continued)

*Primary Examiner* — Yuri Kan
(74) *Attorney, Agent, or Firm* — Klarquist Sparkman, LLP

(57) ABSTRACT

Systems and methods to determine vehicle safety conditions are provided. Techniques include receiving one or more vehicle conditions from vehicle sensors and sending the data to a centralized server. The data is aggregated based on vehicle identifier and location to determine the type and location of the safety condition. The determined safety condition is sent to one or more vehicles in the vicinity of the determined safety condition to alert the drivers of the hazard. The safety condition can be displayed as an overlay on a map to aid the driver in locating it.

19 Claims, 7 Drawing Sheets

(56) References Cited

OTHER PUBLICATIONS

Markus, "Your Car's Contribution to the 'Big Data' Cloud," *Motor Trend*, Jul. 25, 2013, 3 pages.
Rowe, "The Open Source Car and Its Big Data," Aberdeen Group, blogs.aberdeen.com, Aug. 7, 2013, 11 pages.

\* cited by examiner

CENTRALLY-MANAGED VEHICLE NETWORK

FIELD

The field relates to vehicle telematics and connecting vehicles to a centrally-managed cloud.

BACKGROUND

Currently, standard vehicles offer drivers only the information that the driver can see. Some vehicles have sensors that can assist drivers, but these sensors are confined to the particular vehicle and can operate only over a short distance. There is a need to improve driving safety by enabling drivers to know of safety risks that are not in their line-of-sight.

SUMMARY

The Summary is provided to introduce a selection of concepts in a simplified form that are further described below in the Detailed Description. The Summary is not intended to identify key features or essential features of the claimed subject matter, nor is it intended to limit the scope of the claimed subject matter. The following provides representative embodiments of the described concepts.

An embodiment can be implemented as a system for managing vehicle sensor data, the system comprising one or more vehicle condition sensors communicating with communication hardware, the communication hardware configured to transmit vehicle condition sensor data to a central server; wherein the central server is configured to aggregate vehicle condition sensor data by vehicle identifier and vehicle position; determine a safety condition for the aggregated vehicle condition sensor data; and transmit the safety condition to vehicles within an area around the safety condition.

An embodiment can be implemented as a method of managing vehicles, the method comprising receiving vehicle condition sensor data from a plurality of vehicles, the vehicle condition sensor data associated with respective vehicle identifiers and vehicle positions; aggregating the vehicle condition sensor data based on vehicle identifier and vehicle position; comparing the aggregated vehicle condition sensor data to predefined rules; determining a safety condition at a particular location; and transmitting the safety condition and the particular location to vehicles in an area.

An embodiment can be implemented as one or more computer-readable storage media comprising computer-executable instructions that when executed cause a computing system to receive vehicle condition sensor data from a plurality of vehicles, the vehicle condition sensor data associated with respective vehicle identifiers and vehicle positions; aggregate the vehicle condition sensor data based on vehicle identifier and vehicle position; compare the aggregated vehicle condition sensor data to predefined rules; determine a safety condition at a particular location; determine vehicle operation parameters from the aggregated vehicle condition sensor data; determine an operating path of vehicles based on respective vehicle operation parameters; and transmit the safety condition and the particular location to vehicles whose operating path intersects the particular location.

As described herein, a variety of other features and advantages can be incorporated into the technologies as desired.

DETAILED DESCRIPTION

Figure 1:
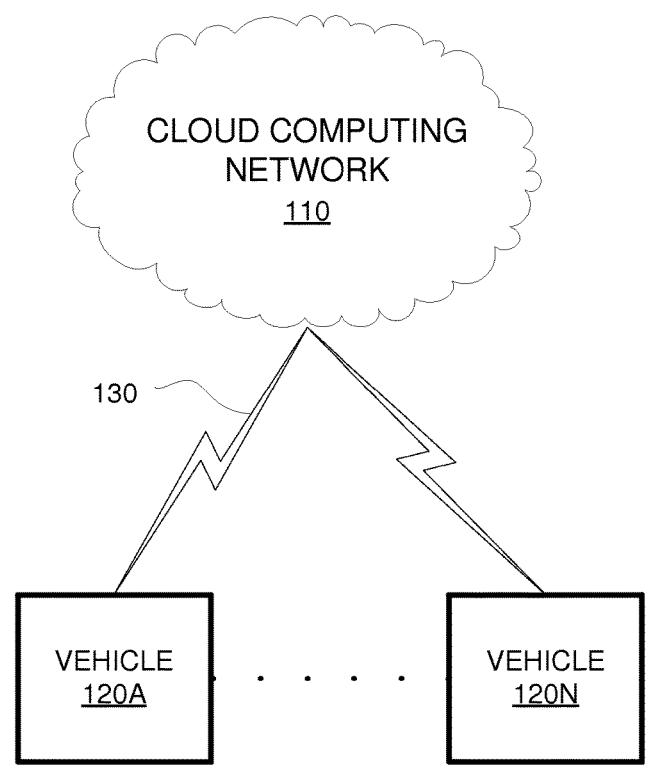
FIG. 1 is a block diagram of an example system for managing vehicles.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "provide" to describe the disclosed methods. These terms are high-level descriptions of the actual operations that are performed. The actual operations that correspond to these terms may vary depending on the particular implementation.

As used herein, the terms "a," "an," and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two elements of a list means any one or more of the listed elements. For example, the phrase "A, B, and/or C" means "A," "B," "C," "A and B," "A and C," "B and C" or "A, B and C."

Example 1

Example Overview

The technologies described herein provide vehicles the ability to connect and share information through a centrally-managed cloud computing system ("cloud"). Vehicles are equipped with sensors that automatically provide vehicle condition information to the cloud. The cloud can aggregate the vehicle information to determine safety conditions that vehicles and drivers have encountered or will encounter. For example, the cloud can: determine why vehicles are standing in traffic; send operating instructions to vehicles to avoid road obstacles; inform drivers of vehicle related safety issues, such as failing headlights; inform drivers that emergency vehicles are approaching from behind; inform drivers of other vehicles that need assistance; and provide instructions to slow down because of a slippery road ahead.

The technologies described herein allow a driver to receive information pertaining to safety conditions that the driver would not otherwise see and avoid. Using aggregated vehicle sensor information, the cloud can determine what safety condition exists, inform vehicles about the safety condition, and provide actions for drivers to take.

Example 2

Example Vehicle

In any of the examples herein, a vehicle can be a motor vehicle used to transport people or cargo. For example, a vehicle can be a private automobile (e.g., personal or commercial), public transportation, an emergency vehicle, or the like.

Vehicles can be equipped with sensors (e.g., hardware sensors) used to acquire information about vehicle conditions. Such conditions can include real-world physical phenomena observed or detected by the sensors. Sensors can provide information on electrical system conditions, mechanical system conditions, and/or other vehicle telematics (e.g., speed and location). The sensors can provide specialized vehicle operation information on steering, braking, vehicle speed, headlights, signal lights, emergency lights, tire air pressure, wheel slippage, and the like. Standard on-board diagnostic (OBD) sensors (e.g., engine performance, throttle position, and exhaust parameters) can also be included. Vehicles can also include sensors to acquire road imagery (e.g., cameras, infrared sensors, ultrasound sensors, and/or radar). Vehicle condition sensor data can be sent from the vehicle to the cloud using communication hardware, as described herein.

Vehicles can include a display for displaying information received from the cloud. For example, the display can present information in a live map to a vehicle driver, as described herein. The live map can present safety conditions to the driver and provide instructions pertaining to the safety condition, such as how to avoid it. Other display systems are possible, such as on-dash displays, on-windshield displays, or the like.

The vehicle can also be equipped with autonomous driving equipment, allowing the vehicle to receive commands from the cloud and drive without the input of a local driver. For example, the vehicle can include a computing device connected to communication hardware for sending vehicle condition sensor data to a centralized cloud server and receiving operating commands from the cloud server. The computing device can execute the commands to drive the vehicle using the autonomous driving equipment.

Example 3

Example Cloud Computing

In any of the examples herein, cloud computing can refer to a shared pool of configurable computing and storage resources, and is generally referred to as the "cloud." Cloud resources can be made up of centrally-managed servers and storage devices. Although centrally-managed in some cases, decentralized functionality can be supported.

Cloud resources can be in one or more public, private, or hybrid clouds. In general, public clouds are run by cloud-based providers for public use, and applications from various software developers can be mixed together on a public cloud's servers, storage systems, and networks. Private clouds are generally owned and operated by a single entity. For example, a software application developer can have its own private cloud; the single entity owns the private cloud infrastructure and has control over how applications are deployed to the private cloud.

Hybrid clouds comprise public and private clouds. Hybrid clouds can provide cloud infrastructure on demand beyond what a private cloud alone can provide, with excess infrastructure provisioned by a cloud service provider operating a public cloud. The ability to augment a private cloud with public cloud resources can be used to maintain application performance (e.g., application response times guaranteed by a cloud service provider) in response to load fluctuations and other events.

Example 4

Example Safety Condition

In any of the examples herein, a safety condition can be a condition and/or event determined by the cloud, as described herein, that has an impact on the vehicle and/or driver. The safety condition provides a driver with additional road information, which is beyond the driver's line-of-sight. The safety condition can be determined from vehicle condition sensor data from a single vehicle or from information aggregated across multiple vehicles. In some implementations, sensor data from a single vehicle can be aggregated, and a safety condition related to that vehicle can be generated. In other implementations, sensor data from more than one vehicle can be aggregated, and the aggregated data can indicate a safety condition related to the more than one vehicle.

Safety conditions can be vehicle related or location related. Vehicle related safety conditions can be determined from the aggregated vehicle condition sensor data from a single vehicle and/or multiple vehicles. For example, dangerous driving behavior can be determined from sensors acquiring data from driver input controls, determining unsafe following distances, and excessive speed in relation to nearby vehicles. Thus, vehicle related safety conditions pertain to a particular vehicle and move accordingly with the vehicle.

Location related safety conditions can be determined from a single vehicle's condition sensors, or it can be determined from more than one vehicle's condition sensors. For example, a location related safety condition can be a disabled vehicle on the side of the road (determined from the disabled vehicle's sensors), or it can be a stretch of slippery pavement along a road (determined by multiple vehicles' sensors indicating slippage in a general area). A location related safety condition is a substantially stationary condition and does not follow any particular vehicle. In other words, the safety condition can change position, but the location moves slowly and is generally unrelated to any single vehicle. For example, slippery road conditions can increase in size or move along the road as rainy or icy conditions change.

Safety conditions can be classified into specific types, as described herein. Safety conditions can also be prioritized based on their type. For example, safety conditions can be classified into one or more of: road hazard, traffic condition, and emergency vehicle.

Example 5

Example System for Determining a Safety Condition

In any of the examples herein, vehicles can communicate with one or more centrally-managed cloud computing resources to upload vehicle condition sensor data. Vehicles can communicate using a standardized application program interface ("API"). The API can allow vehicles from different manufacturers to connect to the cloud.

In some implementations, the API can configure the vehicle to establish a connection over a wireless network (e.g., a mobile phone network or satellite communications network). The API can also be configured to interface with standardized vehicle sensors and/or have custom interfaces for manufacturer specific sensors.

FIG. 1 is a block diagram of an example system 100 for managing vehicles using a cloud computing network (e.g., cloud).

In the example, the cloud computing network 110 receives information from one or more vehicles 120A . . . 120N over a wireless communications connection 130. Vehicles 120A . . . 120N can send condition sensor data, vehicle locations, and vehicle identifiers, as described herein, to the cloud computing network 110. The cloud computing network 110 can aggregate the sensor data and determine if a safety condition is indicated by the aggregated sensor data. If a safety condition exists, the cloud can send the safety condition (e.g., information describing the safety condition, suggested operating instructions, and/or a live map showing the location of the safety condition) to one or more of the vehicles 120A . . . 120N. Each vehicle that receives the safety condition can display it to the driver on a display device (e.g., touch screen, monitor, heads-up display, and the like).

The system 100 and any of the other systems described herein can be implemented in conjunction with any of the hardware components described herein, such as the computing systems described below (e.g., processing units, memory, and the like). In any of the examples herein, the inputs, outputs, requests, databases, and environments can be stored in one or more computer-readable storage media or computer-readable storage devices. The technologies described herein can be generic to the specifics of operating systems or hardware and can be applied in any variety of environments to take advantage of the described features.

Example 6

Method of Determining a Safety Condition

Figure 2:
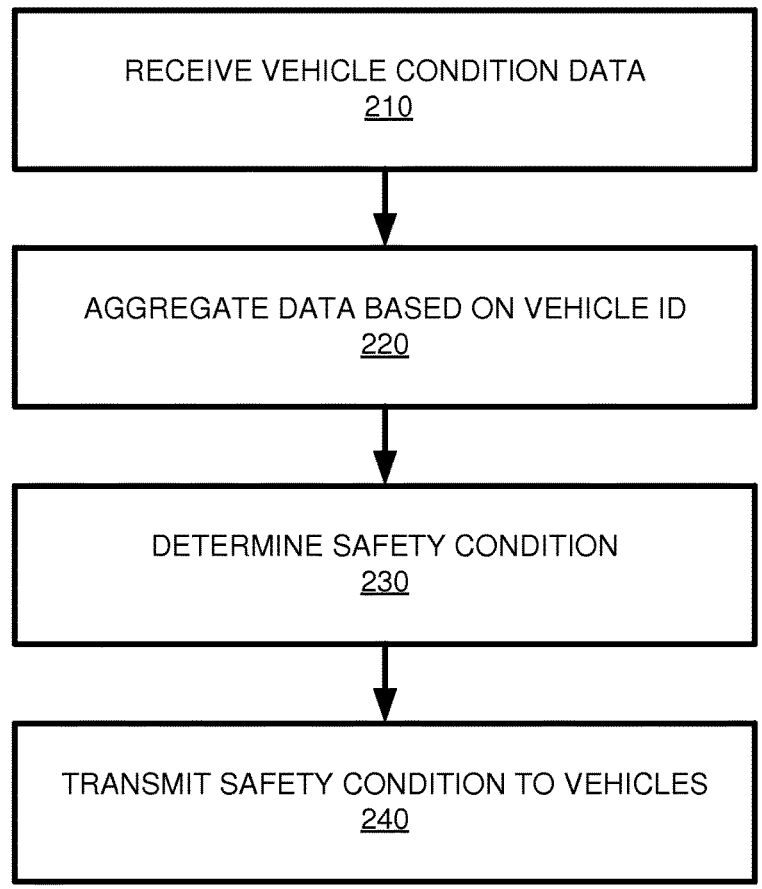
FIG. 2 is a flowchart of an example method of managing a fleet of vehicles.

In any of the examples herein, methods can be provided for determining a safety condition. FIG. 2 is a flowchart of an example method 200 of determining a safety condition, and can be implemented, for example, in the system shown in FIG. 1.

At 210, the cloud can receive vehicle condition sensor data from one or more vehicles through a network connection. Vehicle condition sensor data can be stored in the cloud for a predetermined amount of time depending on the type of data received. For example, data can be used immediately and then purged, stored for several minutes, or stored for hours or days.

At 220, the cloud aggregates the stored vehicle condition sensor data. In some implementations, vehicle condition sensor data can be aggregated based on vehicle identifier and/or vehicle location. This aggregated data can give a snapshot of the conditions that a particular vehicle is encountering or has encountered. In other implementations, specific types of vehicle condition sensor data can be aggregated across more than one vehicle (e.g., speed, steering wheel position, brake pressure, and the like).

At 230, the cloud determines if a safety condition exists. The cloud can determine a safety condition by comparing aggregated data to predefined rules indicating safety conditions, as described herein. If the rule is satisfied, a safety condition is indicated. An expiration date can be associated with the safety condition depending on its type. In some implementations, such as the case of a slippery road condition, the safety condition can expire within an associated time period (e.g., one hour or the like) unless the cloud determines that that the safety condition is still present. For a different safety condition (e.g., an unsafe driver condition), the cloud can set a different expiration period (e.g., one minute or the like).

In some implementations, a safety condition can persist and be stored in a data store long term (e.g., days, weeks, or months). However, the system can be configured so that vehicles only receive the safety condition while it is relevant. Stored data can be used to learn recurring patterns and be able to quickly identify them when they reoccur. For example, if the system identifies that when it rains, a specific road segment becomes slippery, it can provide a warning as soon as it rains without determining a slippery road condition from a vehicle that slipped. In some implementations, the vehicle condition sensor data used to determine a safety condition can be purged or archived as it is not relevant for identifying a pattern.

At 240, the cloud can transmit the safety condition to vehicles affected by the safety condition. Information about the safety condition can be transmitted to the vehicles within a boundary (e.g., defining an area) around the safety condition. In some implementations, the boundary can be a radius or a perimeter with a specific shape and area (e.g., centered or otherwise aligned with the location of the safety condition). A centroid can be computed for locations of the one or more vehicles involved in the safety condition to define a location of the safety condition.

The boundary can also be constrained by the road or roads in the vicinity of the safety condition. The boundary can be dependent on what type or priority of safety condition is determined. For example, in the case of a high priority safety condition, it can be transmitted to the vehicles within a radius around the safety condition. For those safety conditions affecting only one direction of traffic (e.g., in a divided highway scenario), transmission can be limited to the affected direction to conserve bandwidth. Safety condition types can be associated with a property to indicate whether the condition affects only one direction of traffic on specified road types. An internal representation of a road can include a property that indicates its type. Thus, responsive to determining that the condition is of a type that is affected by only one direction of traffic for a given road type and that the condition is occurring on the given road type, transmission can be limited to those vehicles traveling in the affected direction.

In some implementations, as described herein, the cloud can determine which vehicles are likely to encounter the safety condition and limit transmission of the safety condition to only those vehicles.

Example 7

Example Sensor Data

As described above, vehicles can be equipped with sensors to acquire information about electrical systems, mechanical systems, and other vehicle telematics. Sensor data can provide information about the condition of the vehicle, how the vehicle is being operated, and/or the environment the vehicle is in.

Figure 3:
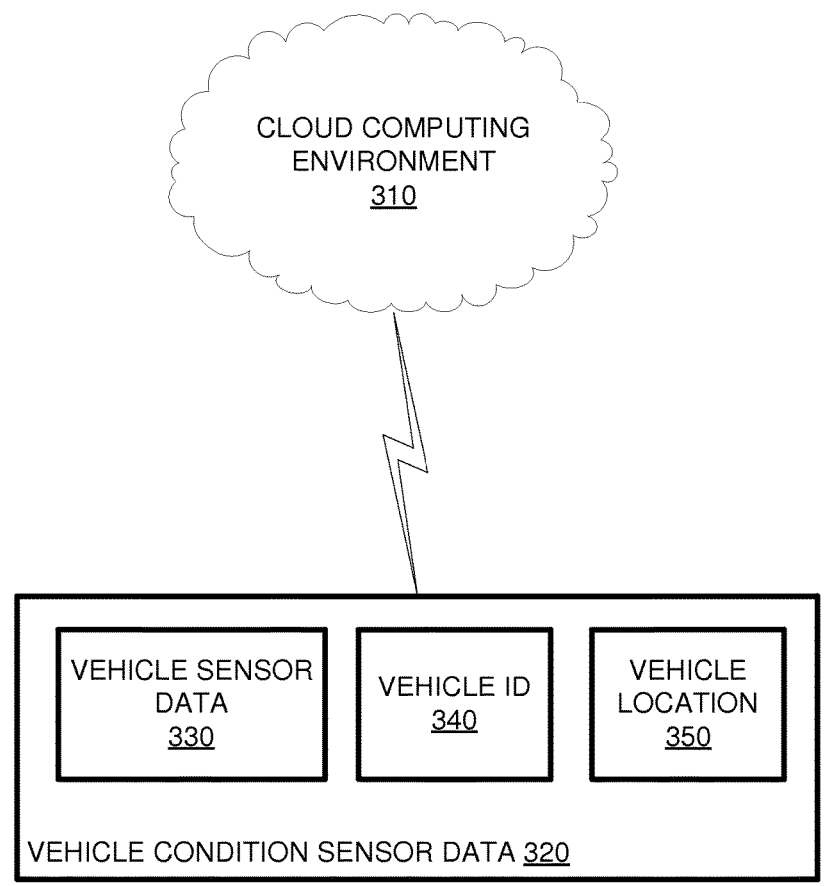
FIG. 3 is a diagram of example vehicle condition sensor data sent to a cloud computing environment.

FIG. 3 is a block diagram of an example system 300 for sending vehicle sensor data to the cloud.

In the example, a cloud computing environment 310 ("cloud") receives vehicle condition sensor data 320 over a wireless connection. Vehicle condition sensor data 320 can comprise vehicle sensor data 330, a vehicle identifier 340, and a vehicle location 350. Vehicle condition sensor data 320 can be packaged in a suitable data structure enabling efficient transmission over low bandwidth connections.

Vehicle sensor data 330 can include measurements taken by one or more sensors, as described above. Measurements can be taken at periodic intervals, depending on the type of sensor used. For example, vehicle speed can be acquired periodically (e.g., every 1, 2, 3, 4, or 5 seconds) because vehicle speed is a slowly changing event. Steering wheel position measurements, on the other hand, can be taken more frequently (e.g., every 0.1 seconds or less than one second) because changes in steering wheel position can occur more rapidly. Vehicle sensor data can also be instantaneous data or averaged data. For example, vehicle braking measurements can be instantaneous and steering wheel position can be averaged. Averaging can be a moving average or weighted average. Instantaneous and averaged data are not limited to braking and steering. Any of the different sensor types can be packaged as instantaneous data or smoothed as averaged data, depending on the specific application. The API can be used to customize how data is sent to the cloud.

Data can be categorized as routine or abnormal. In some implementations, a vehicle on-board system can analyze vehicle condition sensor data and determine that the data is routine and not send it to the cloud in order to reduce load. For example, a vehicle can report only abnormal sensor data (e.g., slipping on road, emergency stop, malfunctioning of one or more vehicle systems, and the like). In some implementations when a vehicle is in the perimeter of a determined safety condition, the cloud can request vehicles within the perimeter of the determined safety condition to also send routine sensor data, even if the vehicle on-board system determines the data is routine and it would ordinarily not be sent, in order to build an accurate image of the ongoing safety condition.

Vehicle condition sensor data 320 can also include a vehicle identifier 340. The vehicle identifier 340 is a unique identification that distinguishes vehicles sending data to the cloud. Vehicle identifier 340 can be hard coded into the vehicle (e.g., using a silicon serial number) or assigned to the vehicle upon first connection to the cloud.

Vehicle condition sensor data 320 can also include a vehicle location 350. Vehicle location 350 can be determined using a global positioning system ("GPS") receiver and/or using wireless network connections. For example, when the vehicle is connected through a wireless mobile connection (e.g., through a wireless phone operator), the vehicle's position can be determined by triangulating cell phone tower connections.

Vehicle condition sensor data 320 can be sent to the cloud computing environment 310 at periodic intervals. Alternatively, the data can be sent if certain predetermined conditions are met. For example, rapid deceleration can trigger sending vehicle condition sensor data 320 to the cloud computing environment 310. In any case, vehicle condition sensor data 320 is sent to the cloud automatically, without any driver interaction.

Example 8

Cross-Platform Operation

In any of the examples herein, cross-platform operation can be supported so that a wide variety of vehicles from different manufacturers supporting different in-vehicle software platforms can participate in the system. For example, a cross-platform internal representation of the sensor data can be implemented so that data can be more quickly aggregated across platforms when determining safety conditions. For example, comprehensive analytics can be performed by normalizing data as needed (e.g., converting from different formats into a single format; converting feet to meters; and the like). A converter process can convert platform-specific sensor data representations into cross-platform (e.g., platform independent) sensor data representations. The original sensor data format can be preserved (e.g., encapsulated within the cross-platform internal representation) so that such data is not lost when not captured by the platform-independent representation or when the platform-specific representation introduces new features according to software upgrades (e.g., not understood or recognized by the conversion process). Custom or platform-specific computations can be performed on such preserved data as needed by downstream analysis, resulting in a richer set of safety conditions that can be detected as platforms evolve.

Such conversion can take place in the vehicle on the server side (e.g., in the cloud), or in transit (e.g., between the vehicle and server).

Example 9

Method for Transmitting Safety Condition Data to Vehicles

Figure 4:
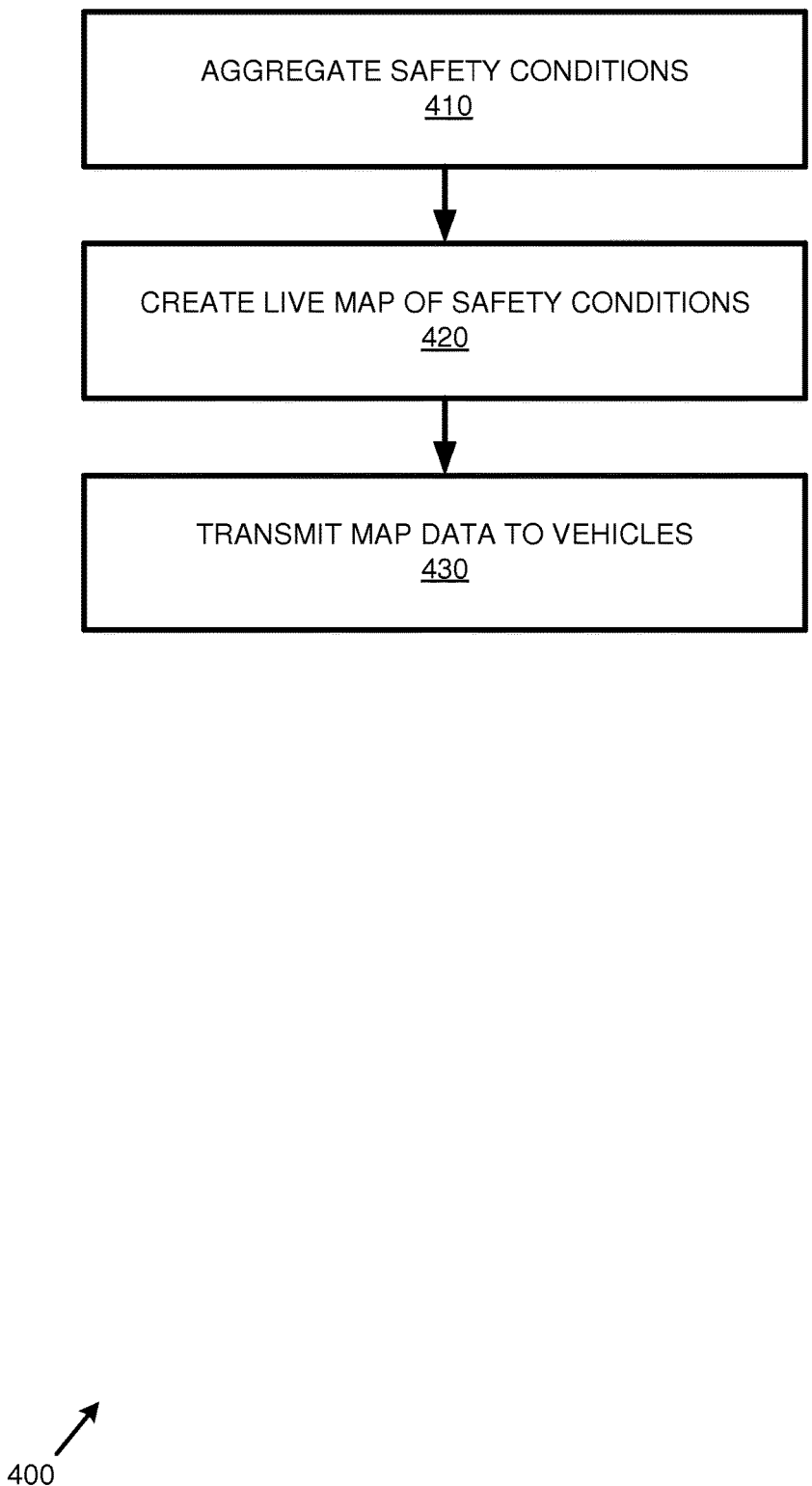
FIG. 4 is a flowchart of an example method for communicating safety conditions to vehicles.

In any of the examples herein, safety conditions can be transmitted individually or as a live map to vehicles. FIG. 4 is a flowchart of an example method 400 of transmitting safety conditions as a live map.

At 410, the cloud can aggregate safety conditions. Safety conditions can be determined, for example, by the method shown in FIG. 2. Safety conditions can be aggregated based on the location of the condition and/or the location of the vehicles used to generate the condition.

At 420, the aggregated safety conditions can be used to populate a live map. In some implementations, safety conditions can immediately populate the live map and not be aggregated. The live map can include information about the location and type of safety condition. The map can contain different layers corresponding to each type of safety condition, different priorities of safety conditions, and/or vehicle identifier. In the case of vehicle identifier layers, the map can comprise layers containing the status of vehicles that are sending vehicle condition information to the cloud. Vehicle identifier layers can be retained by the cloud and not transmitted to remote vehicles.

At 430, the cloud can transmit the map data to vehicles. As such, the system can be configured so that not all map data is sent to all vehicles. For example, map data can be sent to vehicles only within a predetermined perimeter around safety conditions. In some implementations, the cloud can determine the location of a vehicle using the vehicle identifier and only send map data comprising safety conditions that are within a predetermined perimeter around the vehicle. In other implementations, only certain layers of map data can be sent to vehicles.

Example 10

Method of Classifying Safety Conditions

Figure 5:
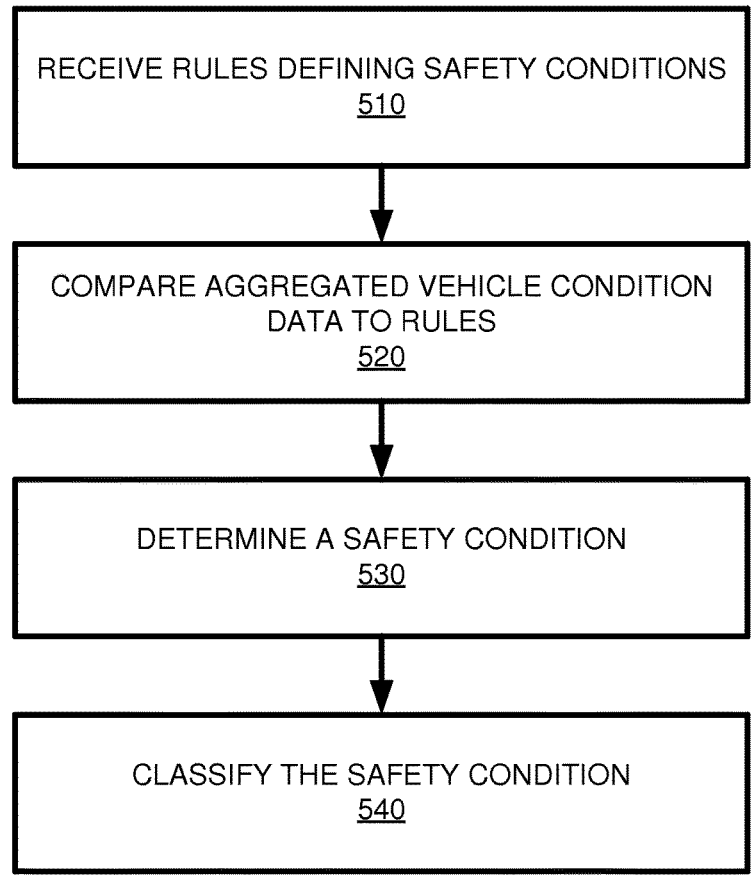
FIG. 5 is a flowchart of an example method of determining and classifying a safety condition.

In any of the examples herein, safety conditions can be classified into one or more categories. FIG. 5 is a flowchart of an example method 500 for classifying safety conditions.

At 510, the cloud can receive rules defining safety conditions. Rules can be stored in the cloud and updated by authorized users. Rules can define safety conditions based on vehicle condition sensor data from one or more vehicles. Table 1 shows example safety conditions and their associated rules. Rules are given and examples of associated vehicle condition sensor data are provided. It should be noted that more or fewer vehicle condition sensor data can be used to interpret the rule.

At 520, the aggregated vehicle condition sensor data are compared to the safety condition detection rules ("rules"). As described above, some rules use sensor data from a single vehicle to determine if a safety condition exists. Other rules use sensor data from multiple vehicles. In the case of rules using sensor data from multiple vehicles, the rules can specify using vehicles only within a predetermined proximity. The use of vehicles within a predetermined proximity can help localize the safety condition and provide more accurate results. The predetermined proximity can be defined globally as a default for the rules or defined within the rule to override the default. For example, in the above examples, the "obstacle on highway" rule does not contain a proximity. Therefore, a default proximity (e.g., 50 feet) can be used. The rule for "slippery road," however, does specify a proximity, in this case 100 feet, and so the default value is not used.

At 530, the cloud can determine a safety condition. If the vehicle condition sensor data satisfy a safety condition detection rule, the cloud determines that a safety condition is present. The location of the safety condition can also be determined from the vehicle condition sensor data. For example, in the case of "obstacle on highway" or "vehicle with flat tire," the location of the safety condition is determined by the position of the vehicles used to generate the safety condition and can be the position of one of those vehicles. In some implementations, vehicle condition sensor data from more than one vehicle are received along with location information. The data can indicate that the vehicles are stationary (e.g., vehicle speed 0), and the vehicles are on

TABLE 1

| Safety Condition | Rule |
| --- | --- |
| Obstacle on highway | Several cars come to a complete stop in the middle of a highway lane.<br>Speed = 0; location = highway; number of vehicles > threshold vehicle count (e.g., 1, 5, 10, or the like). |
| Slippery road | Multiple vehicles lose traction in the same general location (e.g., traction control electronics sense wheel slippage).<br>ESP = activated; number of vehicles > 1; distance between vehicles < threshold distance (e.g., 50, 100, 150 feet, or the like). |
| Vehicle with flat tire | A vehicle comes to a complete stop on the road edge with low air pressure at one of its wheels.<br>Speed = 0; location = side of road; tire pressure < threshold low air pressure (e.g., 15, 20, 25 psi, or the like). |
| Dangerous driving | Vehicle is moving faster than nearby vehicles and/or rapidly changing lanes and/or excessive use of gas or brake pedals and/or vehicle is following too close to next vehicle.<br>Speed(Vehicle A) > average other vehicles in region + threshold excessive speed; steering = fast rate of change; gas pedal position = fast rate of change; brake pedal position = fast rate of change; location of Vehicle A = close behind Vehicle B. |
| Slow moving vehicle | A specific vehicle is reporting lower speed than average for no apparent reason. It might be a driver condition (e.g., new driver, struggling driver, or the like) or a non-reported vehicle problem (e.g., potentially a malfunctioning system with a malfunctioning sensor).<br>Vehicle Speed < average reported speed – (factor * standard deviation) for road segment. |
| Malfunctioning Vehicle | A vehicle reports a malfunctioning system that can cause safety condition.<br>E.g., no headlights, no braking lights, no breaks, flat tire, and the like |
| Emergency vehicle | Vehicle identifier indicates it is an emergency vehicle, and vehicle condition sensors indicate lights and siren are on.<br>Vehicle identifier or vehicle type = emergency; emergency condition = activated (e.g., lights = on; siren = on). Optional: speed > average other vehicles in region + threshold speed.<br>For security purposes, emergency vehicles can be authenticated. An emergency vehicle can have a unique identifier that is registered in the cloud as an emergency vehicle by the authorities (e.g., police, fire department, other law enforcement, and the like). | the same road within a few feet of each other. This data can be compared to the predetermined rules to determine if an obstacle is in the road and also the location of the obstacle.

At 540, the safety condition is classified into one or more classifications. Also, a priority can be assigned. The cloud can collect a large amount of data, and notifying vehicles about too many safety conditions can overwhelm drivers and cause distractions. Therefore, the system can prioritize and classify safety conditions, and preferences can be set to see events regardless of priority or only events that desired according to priority or other criteria (e.g., highly relevant for the driver's safety). In addition, the classification and prioritization of data can enable the cloud provider to generate data on which analytics can be performed that can be useful for road maintenance, traffic management, and merchants (e.g., for controlling roadside advertisements).

Safety conditions can be classified as one or more of: road hazard, traffic condition, or emergency vehicle. Other classification can be defined and stored in the cloud. Classifications can be used to prioritize safety conditions and limit transmission of safety conditions to vehicles that are configured to receive them. For example, a vehicle can be configured to only receive road hazard and emergency vehicle safety conditions. In that case, the safety conditions classified as traffic conditions would not be sent.

Example 11

Method of Targeting Vehicles to Receive Safety Conditions

Figure 6:
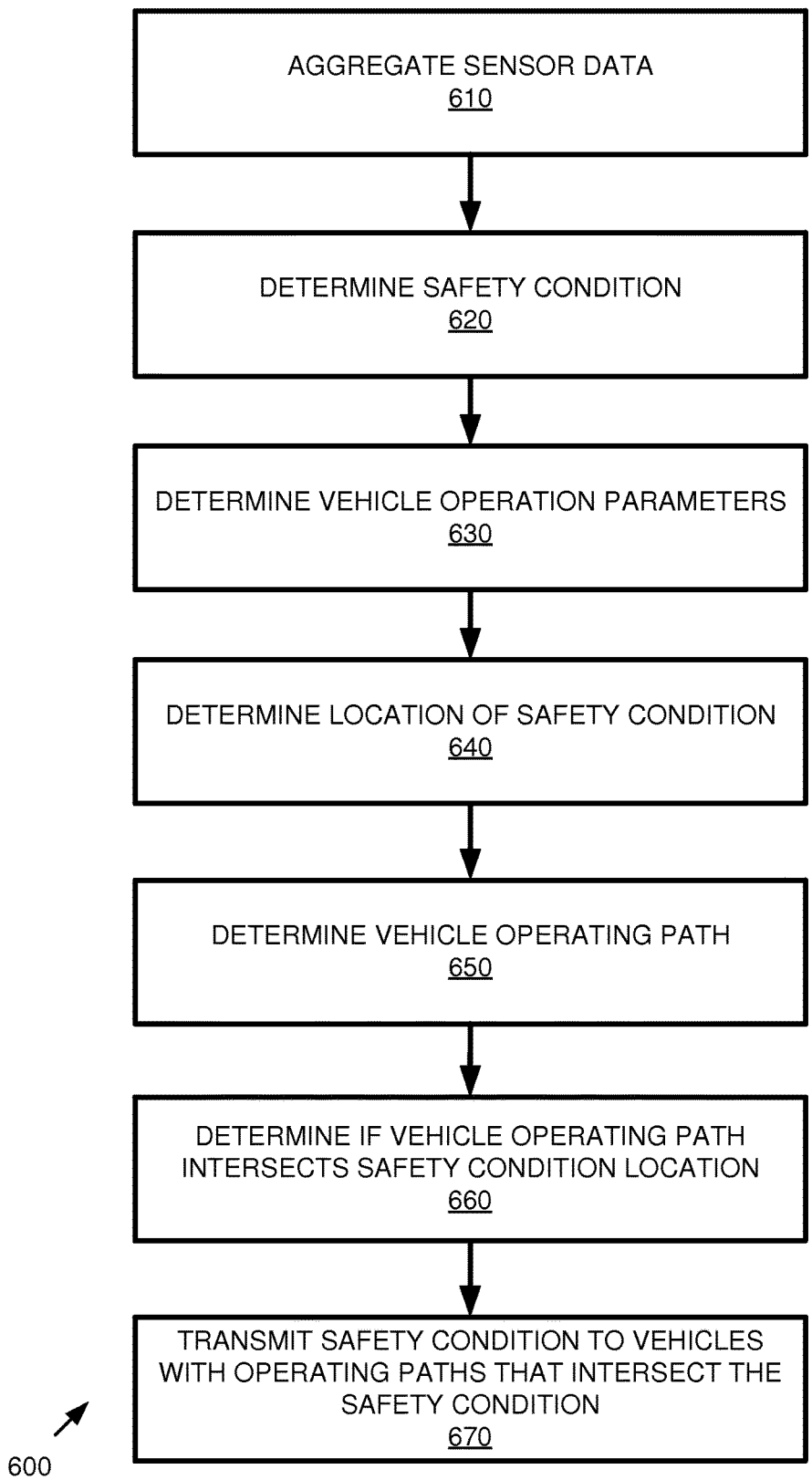
FIG. 6 is a flowchart of an example method of determining which vehicles receive safety condition information.

In any of the examples herein, the cloud can determine which vehicles receive safety conditions based on whether the vehicle is likely to encounter the safety condition (e.g., targeted vehicles). FIG. 6 is a flowchart of an example method 600 of transmitting safety conditions to targeted vehicles.

At 610, the cloud aggregates the stored vehicle condition sensor data. Vehicle condition sensor data can be aggregated as in Example 6 and/or Example 9.

At 620, the cloud determines if a safety condition exists. As explained above, the cloud can determine a safety condition by comparing aggregated data to predefined rules indicating safety conditions to determine if the rule was satisfied. If the conditions set forth in the rule are satisfied, a safety condition is indicated.

At 630, the cloud analyzes aggregated vehicle condition sensor data to determine vehicle operation parameters. Vehicle operation parameters can be determined for each vehicle identifier. Vehicle operation parameters can include, but are not limited to, speed, direction of movement, planned route (e.g., navigation data), and current road the vehicle is traveling on. In other words, vehicle operation parameters describe the operation of the vehicle in terms of its environment (e.g., movement, position, etc.).

At 640, the location of the safety condition can be determined from the vehicle operation parameters. In many cases, the safety condition can be external to any single vehicle and is inferred by vehicle condition sensor data. Therefore, vehicle operation parameters, describing the direction of travel, speed of travel, steering wheel position changes, etc., can be used to locate the safety condition. For example, in the case of an obstacle in the road, multiple vehicles will slow and steer around the obstacle at different rates and directions. The cloud can plot this data and determine the position of the obstacle.

At 650, the operating path of a vehicle is determined based on the vehicle operation parameters. The operating path is a projection of where the vehicle is predicted to be in the future. The operating path can be drawn on a map. As the path becomes farther from the actual location of the vehicle, the certainty of the operating path decreases. This uncertainty can be represented by a widening of the projected path.

At 660, the cloud determines if the operating path of the vehicle intersects the location of a safety condition. For example, the operating path and safety condition are determined to intersect if the safety condition lies on the operating path (e.g., within a threshold distance or travel time, or the like). As such, if the safety condition is on a certain highway and the operating path of a vehicle is projected to travel down the certain highway, then the path and condition are determined to intersect.

At 670, the cloud transmits the safety condition only to those vehicles that have operating paths that intersect the safety condition. In some implementations, transmission can be further restricted to an area around the safety condition. In other words, vehicles farther away than a predetermined distance from the safety condition will not receive the safety condition information, regardless of whether their operating paths intersect the safety condition. This further restriction is useful in reducing the amount of data transferred on low bandwidth network connections.

Example 12

Example Central Control of Traffic Patterns

In any of the examples herein, the cloud can alter traffic patterns near the location of a safety condition and/or based on the aggregated vehicle condition sensor data. The cloud can use aggregated vehicle sensor data and vehicle operation parameters to populate a live map, as described above. The live map can provide the current status of the vehicles connected to the cloud. The cloud can then use this data to affect traffic patterns.

In some implementations, the cloud can be connected to municipal traffic systems that control traffic patterns (e.g., signal lights, lane direction control, and lane priority). For example, vehicle operation parameters in localized areas can be used to manage traffic signals to enhance the flow of traffic. The cloud can also dynamically allocate lanes (e.g., high occupancy vehicle lanes) based on vehicle operation parameters.

In some implementations, the cloud can instruct vehicles to perform certain actions based on safety condition. The instructions effectively alter traffic patterns near the safety condition. For example, based on the vehicle identifier, the cloud can prioritize vehicles by the type of vehicle. Emergency vehicles can have highest priority, public transportation can have next highest priority, carpooling vehicles can be next highest, and single occupancy vehicles can have lowest priority. Instructions can be sent from the cloud to vehicles commanding them to use certain lanes of a highway depending on their priority. In implementations where the vehicle is equipped with automated driving equipment, the vehicle would execute the commands and travel in the assigned lane. Further, the cloud can command the vehicles to occupy only certain lanes to travel in a specific direction. By instructing vehicles to use certain lanes, the cloud can effectively alter traffic patterns to reduce congestion or allow, for example, emergency vehicles to pass through traffic unimpeded.

In implementations where drivers still make driving decisions, compliance with cloud instructions (e.g., an order to change lanes) can be incentivized. For example, low (e.g., single) occupancy vehicles can be permitted to drive in car-pooling and public transportation lanes as long as long as the driver complies with cloud instructions (e.g., to change lanes for cars with higher priority). In another example, information, such as vehicle identifier, of non-compliant vehicles can be sent to enforcement authorities, and a traffic infraction can be generated (e.g., the vehicle is ticketed and fined).

Example 13

Example Computing Systems

Figure 7:
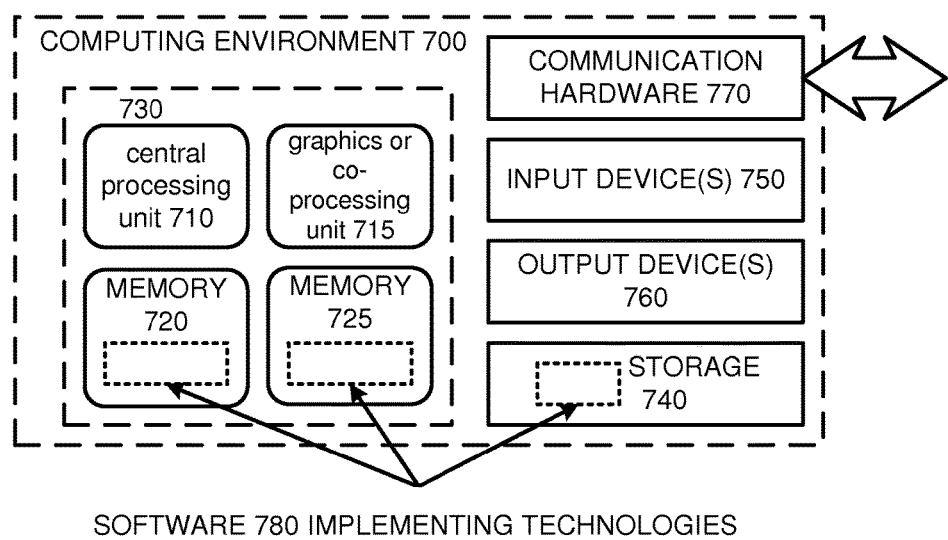
FIG. 7 is a computing system in which described embodiments can be implemented.

FIG. 7 illustrates a generalized example of a suitable computing system 700 in which several of the described innovations can be implemented. The computing system 700 is not intended to suggest any limitation as to scope of use or functionality, as the innovations may be implemented in diverse general-purpose or special-purpose computing systems. The computing system 700 can be implemented within the described vehicles, in the described cloud computing network, in servers, and the like. For in-vehicle scenarios, vehicle-specific and/or in-vehicle computing systems can be employed.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and communication hardware 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The computer-readable storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein. The storage 740 does not include signals per se.

The input device(s) 750 may be a touch input device such as a keyboard, mouse, pen, or trackball, a voice input device, a scanning device, or another device that provides input to the computing system 700. For video acquisition, the input device(s) 750 may be a camera or similar device. Input device(s) 750 can also include location determining devices. Location can be determined using the global position system ("GPS"), thus input device(s) 750 can include a GPS receiver and antenna. Location can also be determined by use of wireless networks, so input device(s) 750 can also include connections to communication hardware 770 to receive input from wireless networks.

The output device(s) 760 may be a display, speaker, or another device that provides output from the computing system 700.

For those systems communicating sensor data, communication hardware 770 can be included. Other systems can include similar hardware for network functionality. The communication hardware 770 enables communication of sensor data (e.g., to the cloud or a computing entity). A communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. The communication hardware 770 can include a network node; radio with an antenna and electronics; or the like, which are configured to transmit and receive data (e.g., from a remote server or to another device that does so). For example, communication hardware 770 can transmit data over a mobile phone network using 3G, LTE, GPRS, or any other standard protocol. The communication hardware 770 can also employ satellite communication technology, allowing for increased range and communication when mobile phone networks are not available.

Additional functionality can be implemented in the computing environment 700 to process data before sending to the cloud as described herein.

When the term "server" is used, implementations can include more than one server (e.g., implemented as a server farm or distributed computing employing load balancing, security, and other services).

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 14

Computer-Readable Media

Any of the computer-readable storage media herein is non-transitory (e.g., volatile memory such as DRAM or SRAM, nonvolatile memory such as magnetic storage, optical storage, solid state disks, or the like) and tangible. None of the computer-readable media herein include signals per se. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 15

Example Advantages

The technologies described herein can enable increased environmental awareness for car drivers, increasing safety and reducing traffic congestion. By aggregating vehicle information over a large number of vehicles, safety conditions can be determined, and drivers can be informed about the safety conditions before they are encountered. In this way, the technologies provide drivers with increased situational awareness and the ability to "see" mile in advance.

Another advantage of the described technologies is that vehicle management system can use the aggregated vehicle information to guide traffic and ensure efficient use of available resources, such as road capacity, vehicle capabilities, and other relevant factors. The technologies can prioritize vehicle traffic based on overall traffic needs. For example, emergency vehicles can have highest priority, public transportation can have next highest priority, carpooling vehicles can be next highest, and single occupancy vehicles can have lowest priority. For example, emergency vehicles can have priority over other vehicles, and the system described herein can provide operating instructions to vehicles of lower priority to not impede the emergency vehicles.

Another advantage of the described technologies is that vehicle management system reconfigure traffic patterns based on aggregated vehicle condition sensor data and the determined safety conditions. In one example, the number of highway lanes available to vehicles can be changed from e.g., four lanes in each direction, to seven lanes in one direction and one lane in the other direction.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:

1. A system for managing vehicle sensor data, the system comprising:
   one or more vehicle condition sensors communicating with communication hardware, the communication hardware configured to transmit vehicle condition sensor data to a central server;
   wherein the central server is configured to:
      aggregate vehicle condition sensor data by vehicle identifier and vehicle position;
      determine a safety condition for the aggregated vehicle condition sensor data; and
      transmit the safety condition to vehicles within an area around the safety condition, wherein the area is based on a classification of the safety condition.

2. The system of claim 1, wherein the central server is further configured to:
   create a live map of safety conditions;
   wherein the live map comprises information layers associated with each vehicle identifier.

3. The system of claim 1, wherein the central server is further configured to send operating instructions to the vehicles, wherein the operating instructions inform a driver about the safety condition.

4. The system of claim 1, further comprising a vehicle display, wherein the vehicle display is configured to display the safety condition.

5. The system of claim 1, wherein vehicle condition sensors comprise:
   one or more electric system sensors;
   one or more mechanical system sensors; and
   a vehicle speed sensor.

6. The system of claim 1, wherein the central server is further configured to:
   compare aggregated vehicle condition sensor data for each vehicle identifier within an area to a set of predefined rules.

7. The system of claim 6, wherein the set of predefined rules comprises:
   a dangerous driving rule;
   a slippery road rule; and
   an emergency vehicle rule.

8. The system of claim 1, wherein the central server is further configured to:
   determine vehicle operation parameters from the aggregated vehicle condition sensor data; and
   from the vehicle operation parameters, determine a location of the safety condition.

9. The system of claim 8, wherein the location of the safety condition is location related.

10. The system of claim 8, wherein the location of the safety condition is vehicle related.

11. The system of claim 8, wherein the central server is further configured to:
    determine an operating path of vehicles based on respective vehicle operation parameters; and
    constrain communication of the safety condition to vehicles whose operating path intersects the location of the safety condition.

12. The system of claim 11, wherein the central server is further configured to send instructions to the vehicles to move to a predetermined lane when the safety condition is associated with an emergency vehicle and the operating path of the emergency vehicle intersects with the operating path of the vehicles.

13. A method of managing vehicles, the method comprising:

receiving vehicle condition sensor data from a plurality of vehicles, the vehicle condition sensor data associated with respective vehicle identifiers and vehicle positions;

aggregating the vehicle condition sensor data based on vehicle identifier and vehicle position;

comparing the aggregated vehicle condition sensor data for the plurality of vehicles to predefined rules associated with safety conditions;

determining a safety condition at a particular location based on the comparison; and transmitting the safety condition and the particular location to vehicles in an area.

14. The method claim 13, wherein the vehicle condition sensor data comprises:

an electric system condition;
a mechanical system condition; and
a vehicle speed.

15. The method claim 13, further comprising:

aggregating safety conditions at the particular location; and sending the aggregated safety conditions to vehicles within an area around the aggregated safety conditions.

16. The method claim 13, further comprising classifying the safety condition as one of: road hazard, traffic condition, or emergency vehicle.

17. The method claim 13, further comprising:

based on the safety condition at the particular location, altering traffic patterns near the safety condition to route vehicles in an area around the safety condition.

18. The method claim 17, wherein altering traffic patterns comprises one of dynamically assigning lanes, managing traffic signals, and providing a driving priority to vehicles near the safety condition;

wherein the driving priority comprises: emergency vehicle, public transportation, carpooling, and standard cars.

19. One or more non-transitory computer-readable storage media comprising computer-executable instructions that when executed cause a computing system to:

receive vehicle condition sensor data from a plurality of vehicles, the vehicle condition sensor data associated with respective vehicle identifiers and vehicle positions;

aggregate the vehicle condition sensor data based on vehicle identifier and vehicle position;

compare the aggregated vehicle condition sensor data to predefined rules;

determine a safety condition at a particular location;

determine vehicle operation parameters from the aggregated vehicle condition sensor data;

determine an operating path of vehicles based on respective vehicle operation parameters; and transmit the safety condition and the particular location to vehicles whose operating path intersects the particular location.

* * * * *